United States Patent
Ghiotti et al.

(10) Patent No.: US 10,194,686 B2
(45) Date of Patent: Feb. 5, 2019

(54) UNIT FOR ATTACHING MOUTHPIECES TO CIGARS

(71) Applicant: G.D SOCIETA' PER AZIONI, Bologna (IT)

(72) Inventors: Roberto Claudio Franco Ghiotti, Monte S. Pietro (IT); Luca Federici, Bologna (IT)

(73) Assignee: G.D SOCIETA' PER AZIONI, Bologna (IT)

( * ) Notice: Subject to any disclaimer, the term of this patent is extended or adjusted under 35 U.S.C. 154(b) by 44 days.

(21) Appl. No.: 15/433,242

(22) Filed: Feb. 15, 2017

(65) Prior Publication Data

US 2017/0231268 A1   Aug. 17, 2017

(30) Foreign Application Priority Data

Feb. 15, 2016   (IT) .................... 102016000014935

(51) Int. Cl.
  *A24C 5/47*   (2006.01)
  *B65G 37/00*   (2006.01)
  *B65G 47/84*   (2006.01)
  *A24C 5/52*   (2006.01)

(52) U.S. Cl.
  CPC ................. *A24C 5/47* (2013.01); *A24C 5/52* (2013.01); *B65G 37/00* (2013.01); *B65G 47/846* (2013.01)

(58) Field of Classification Search
  CPC .................................. A24C 5/47; A24C 5/52
  See application file for complete search history.

(56) References Cited

U.S. PATENT DOCUMENTS

2016/0073684 A1* 3/2016 Mironov .............. A24F 47/006
                                                                 131/58
2018/0098566 A1* 4/2018 Sikora .................... A24C 5/478

FOREIGN PATENT DOCUMENTS

| EP | 1 101 701 A1 | 5/2001 |
| EP | 1 167 201 A1 | 1/2002 |
| EP | 1 388 298 A1 | 2/2004 |
| EP | 1 559 332 A1 | 8/2005 |

* cited by examiner

*Primary Examiner* — Eric Yaary
(74) *Attorney, Agent, or Firm* — Marshall, Gerstein & Borun LLP

(57) ABSTRACT

Unit for the attachment of mouthpieces to cigars having: a first belt conveyor provided with first pockets, which are designed to contain respective cigars, so as to feed the cigars along a straight attachment path; a second belt conveyor arranged parallel and next to the first belt conveyor and provided with second pockets, which are designed to contain respective mouthpieces, so as to feed the mouthpieces along the attachment path; and a coupling device provided with at least one pushing member, which is arranged along the attachment path in the area of an attachment station and is movable along an attachment direction that is perpendicular to the attachment path, so as to push a mouthpiece carried by a second pocket towards a corresponding cigar carried by a first pocket and then attach the mouthpiece to the cigar.

10 Claims, 9 Drawing Sheets

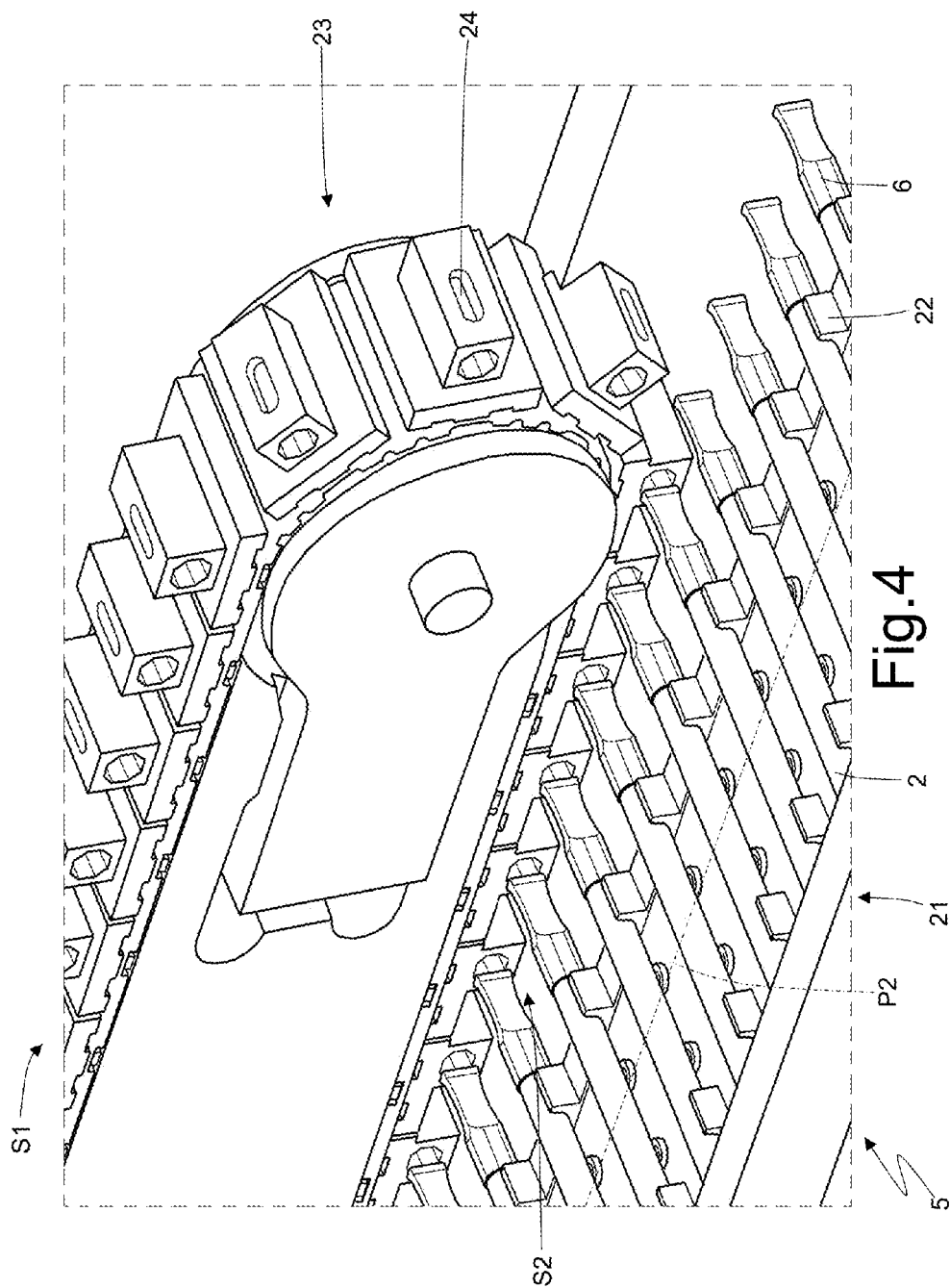

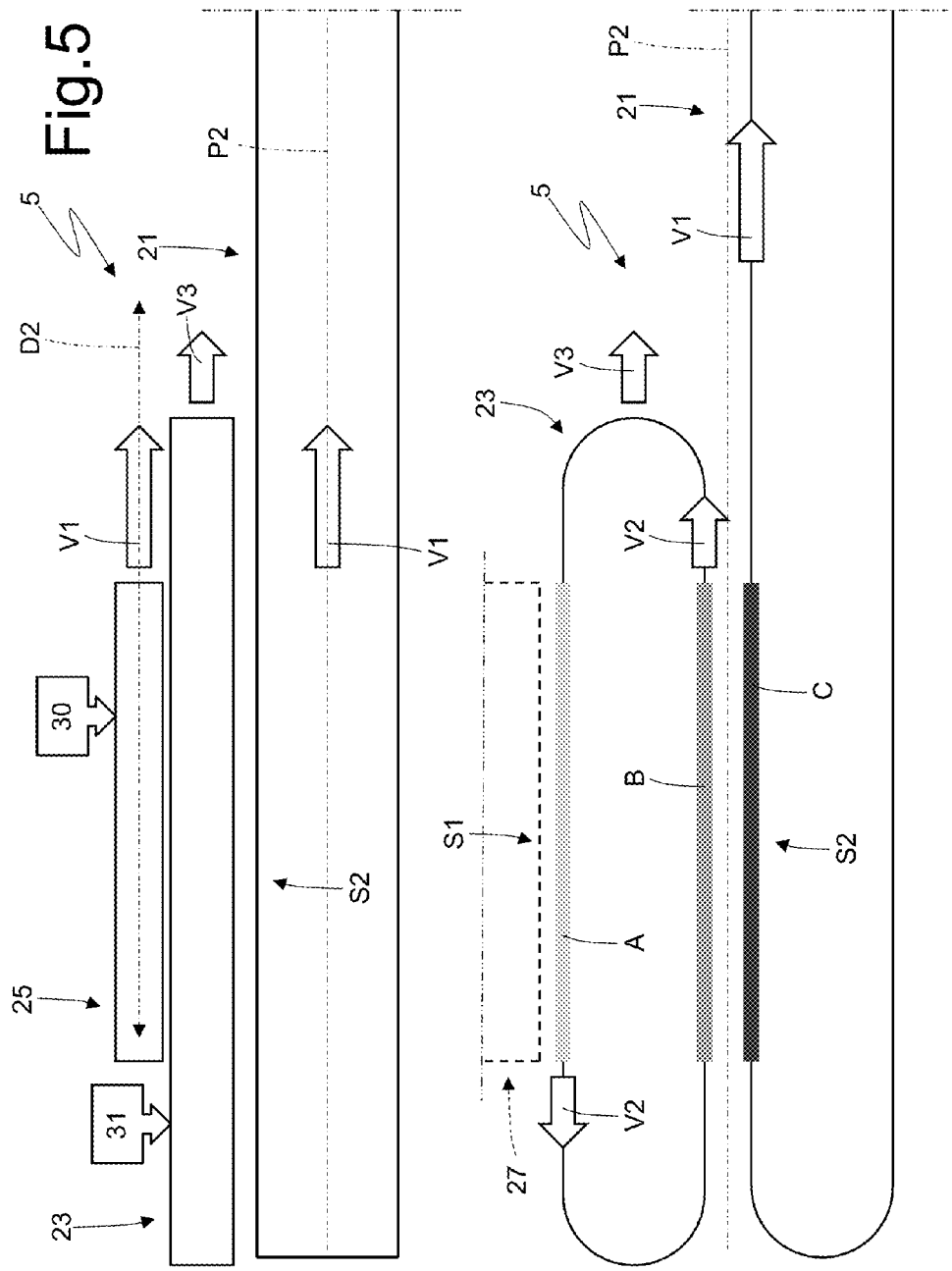

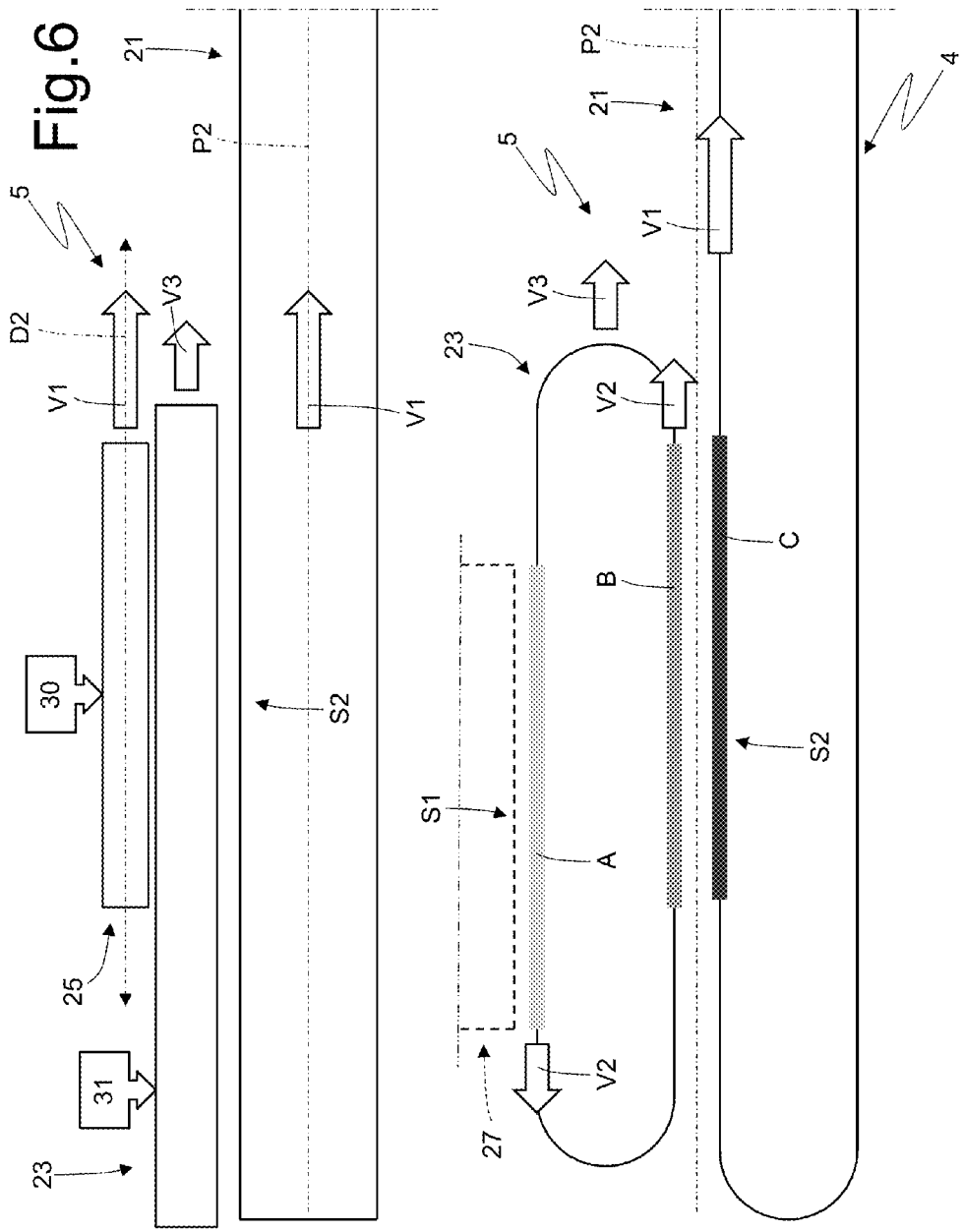

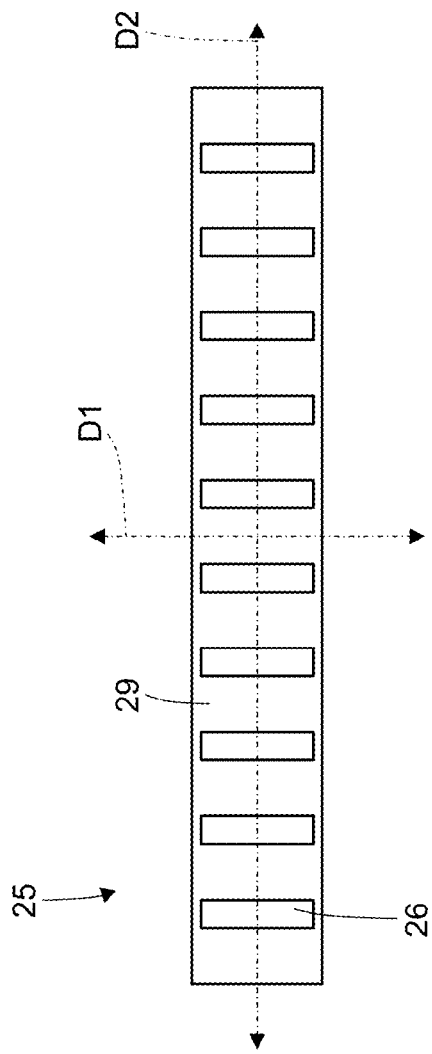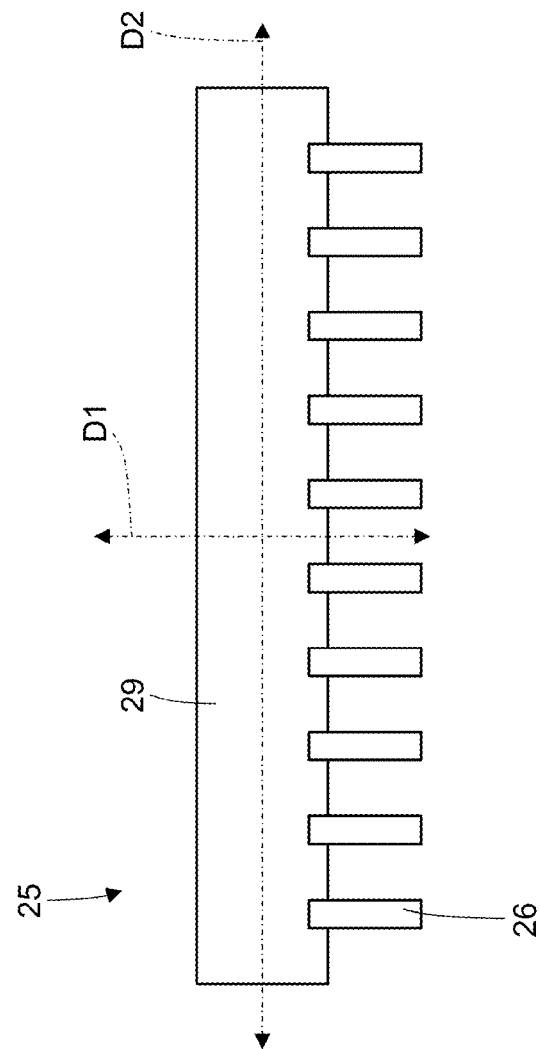

UNIT FOR ATTACHING MOUTHPIECES TO CIGARS

PRIORITY CLAIM

This application claims priority from Italian Patent Application No. 102016000014935 filed on Feb. 15, 2016, the disclosure of which is incorporated by reference.

TECHNICAL FIELD

The present invention relates to a unit for the attachment of mouthpieces to cigars.

PRIOR ART

Currently the attachment of mouthpieces to cigars is generally carried out manually; however, said manual attachment, during the manufacturing of the cigars, along an automated line results in a drop in productivity and the discontinuous operation of the machine for packaging cigars, along with a substantial increase of production costs.

In trying to solve the above described drawbacks, the unit for the attachment of mouthpieces to cigars described in the patent application EP1559332A1 has been proposed. The attachment unit comprises a belt conveyor which is provided with pockets designed to contain respective cigars so as to feed the cigars themselves with a continuous motion along an attachment path which is rectilinear and horizontal, and a horizontal attachment wheel which is arranged next to the belt conveyor, rotates with a continuous motion around a vertical rotation axis and supports a plurality of retaining elements each designed to receive and hold a corresponding mouthpiece; the continuous rotation of the attachment wheel leads each retaining element to pass through a retaining station in which the retaining element receives a corresponding mouthpiece and a transfer station in which the retaining element transfers (attaches) the mouthpiece to a cigar carried by a pocket of the belt conveyor. Each retaining element is rotatably mounted on the attachment wheel to rotate with respect to the attachment wheel itself around a rotation axis parallel to the rotation axis of the attachment wheel; in the transfer station, each retaining element rotates with respect to the attachment wheel so as to chase the corresponding cigar for a given segment of the straight attachment path.

However, the attachment unit described in the patent application EP1559332A1 has some drawbacks, since it is relatively complex and expensive to manufacture and does not allow to achieve particularly high operational speed as in the transfer station each retaining element remains coupled to a corresponding pocket of the belt conveyor for a very short segment of the straight attachment path.

DESCRIPTION OF THE INVENTION

The object of the present invention is to provide a unit for the attachment of mouthpieces to cigars which is free from the drawbacks described above and is, at the same time, easy and inexpensive to manufacture.

According to the present invention, a unit for the attachment of mouthpieces to cigars is provided, as claimed in the attached claims.

BRIEF DESCRIPTION OF THE DRAWINGS

The present invention will now be described with reference to the accompanying drawings, which illustrate a non-limiting embodiment, wherein:

FIG. 4 is a schematic and perspective view of a detail of the unit for the attachment of mouthpieces of FIG. 1;

FIGS. 5 and 6 are two schematic plan and front views of a feeding station and of an attachment station of the unit for the attachment of mouthpieces of FIG. 1 in two different operating positions;

FIGS. 7 and 8 are two schematic plan views of a coupling device of the unit for the attachment of mouthpieces of FIG. 1 in two different operating positions;

PREFERRED EMBODIMENTS OF THE INVENTION

Figure 1:
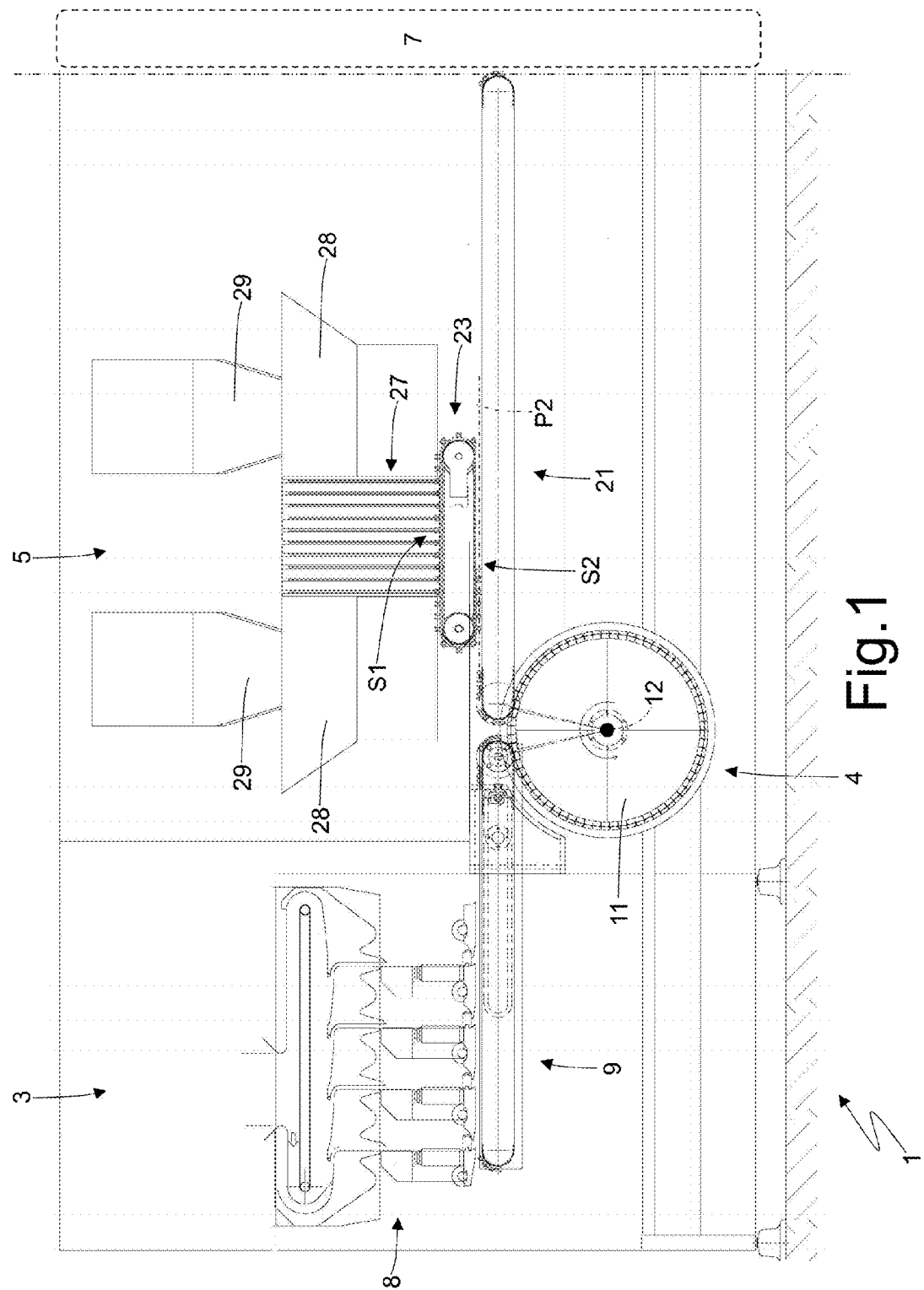
FIG. 1 is a schematic front view of part of a packaging machine for cigars comprising a unit for the attachment of mouthpieces made according to the present invention.
Figure 2:
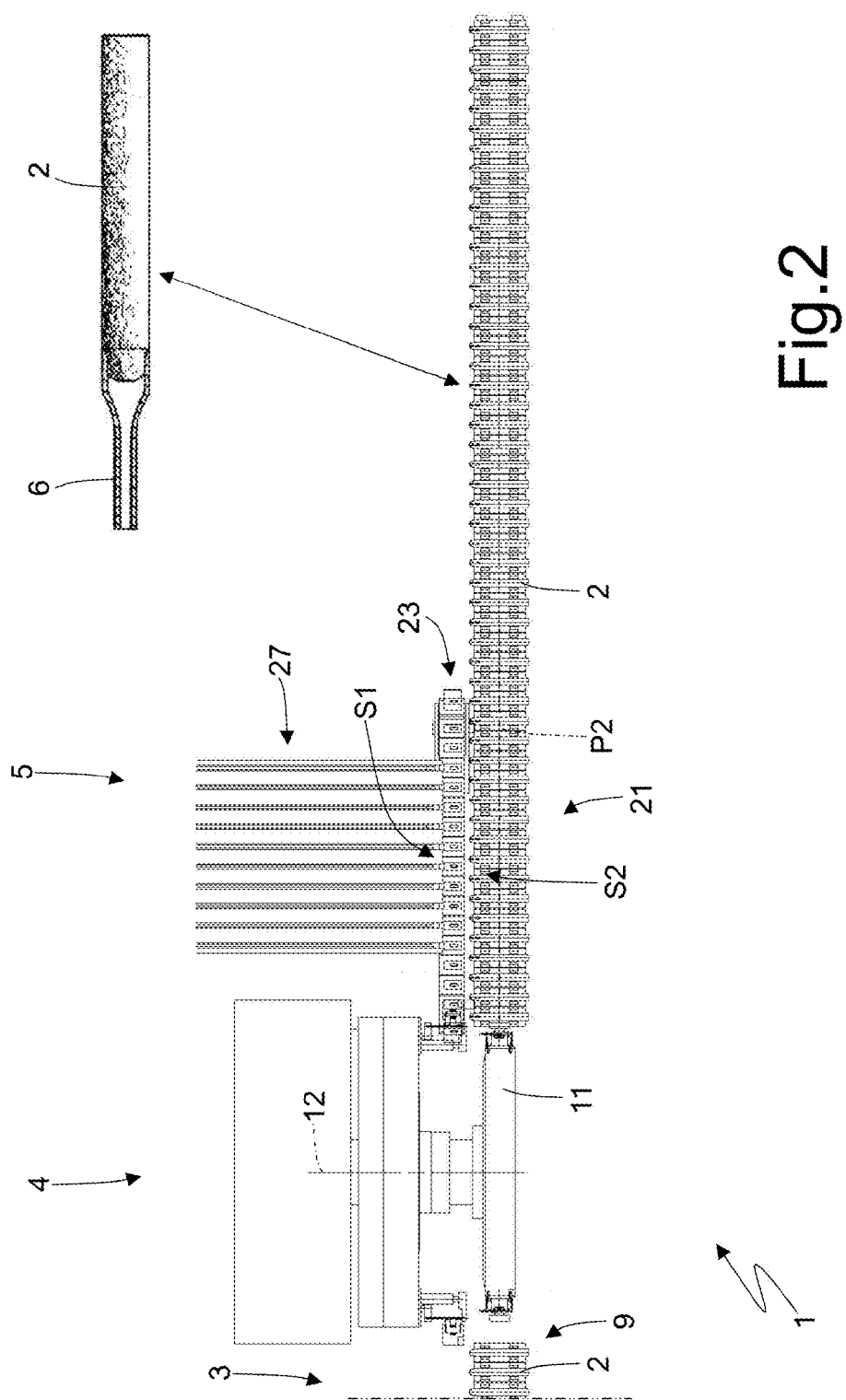
FIG. 2 is a schematic and plan view of the unit for the attachment of mouthpieces of FIG. 1.

In FIGS. 1 and 2 number 1 denotes as a whole a packaging machine (only partially illustrated) which packages cigars 2 in corresponding wrappings of transparent and heat-sealable plastic material. The packaging machine 1 comprises an input unit 3 (of a known type, for example as described in patent application EP1101701A1) which receives a disordered mass of cigars 2 from a packaging machine (by means of a direct connection, or by means of trays) and orders the disordered mass of cigars 2 itself in an ordered succession of cigars 2. The packaging machine 1 comprises a processing unit 4 (of a partially known type, for example as described in patent application EP1388298A1) which is arranged downstream of the input unit 3 (i.e. receives cigars from the input unit 3), and carries out processing procedures (in particular a perforation and a drawing procedure in the area of one end, as better described hereinafter) on the cigars 2. The packaging machine 1 comprises an attachment unit 5 which is arranged downstream of the processing unit 4 (i.e. receives the cigars from the processing unit 4) and attaches respective mouthpieces 6 to the cigars 2. Finally, the packaging machine 1 comprises a wrapping unit 7 (schematically illustrated and of a known type, for example as described in patent application EP1167201A1) which is arranged downstream of the attachment unit 5 (i.e. receives the cigars 2 from the attachment unit 5) and produces corresponding wrappings of transparent and heat-sealable plastic material around the cigars 2. It is important to note that in the packaging machine 1 the attachment unit 5 is optional, i.e. may be provided (as illustrated in FIG. 1), or also may not be provided (in this case the processing unit 4 directly feeds the cigars 2 to the wrapping unit 7). The processing unit 4 is also optional, i.e. may be provided (as illustrated in FIG. 1), or also may not be provided (in this case the input unit 3 feeds the cigars 2 directly to the attachment unit 5 or to the wrapping unit 7).

The input unit 3 comprises a hopper 8 which receives from above the disordered mass of cigars 2 and a belt conveyor 9 that is provided with a plurality of pockets 10 (illustrated in FIG. 9), which are designed to contain respective cigars 2 to feed the cigars 2 themselves along a straight path.

Figure 9:
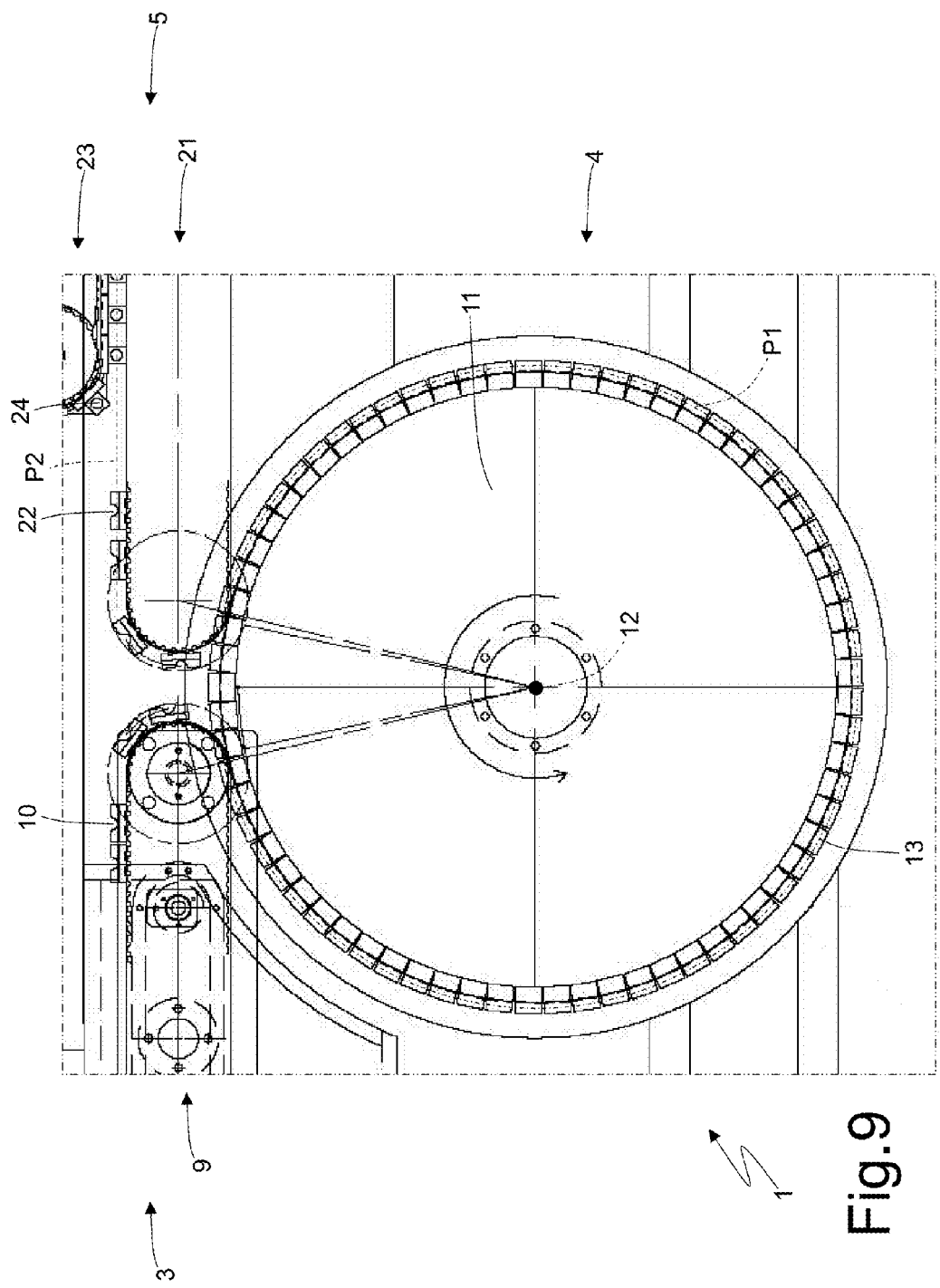
FIG. 9 is a front view of a processing unit of the packaging machine of FIG. 1.

As illustrated more clearly in FIG. 9, the processing unit 4 comprises a processing wheel 11 that is vertically arranged and is rotatably mounted to rotate around a horizontal rotation axis 12 (perpendicular to the plane of FIG. 9) to rotate, in use, with a continuous motion around the rotation axis 12 itself. The processing wheel 11 is provided with outlying pockets 13 (axially arranged), which are designed to contain respective cigars 2 so as to feed the cigars 2 along a circular processing path P1. In particular, the processing wheel 11 receives in succession the cigars 2 from the belt conveyor 9 of the input unit 3, feeds the cigars 2 along the processing path P1, and transfers in succession the cigars 2 to the attachment unit 5.

Figure 10:
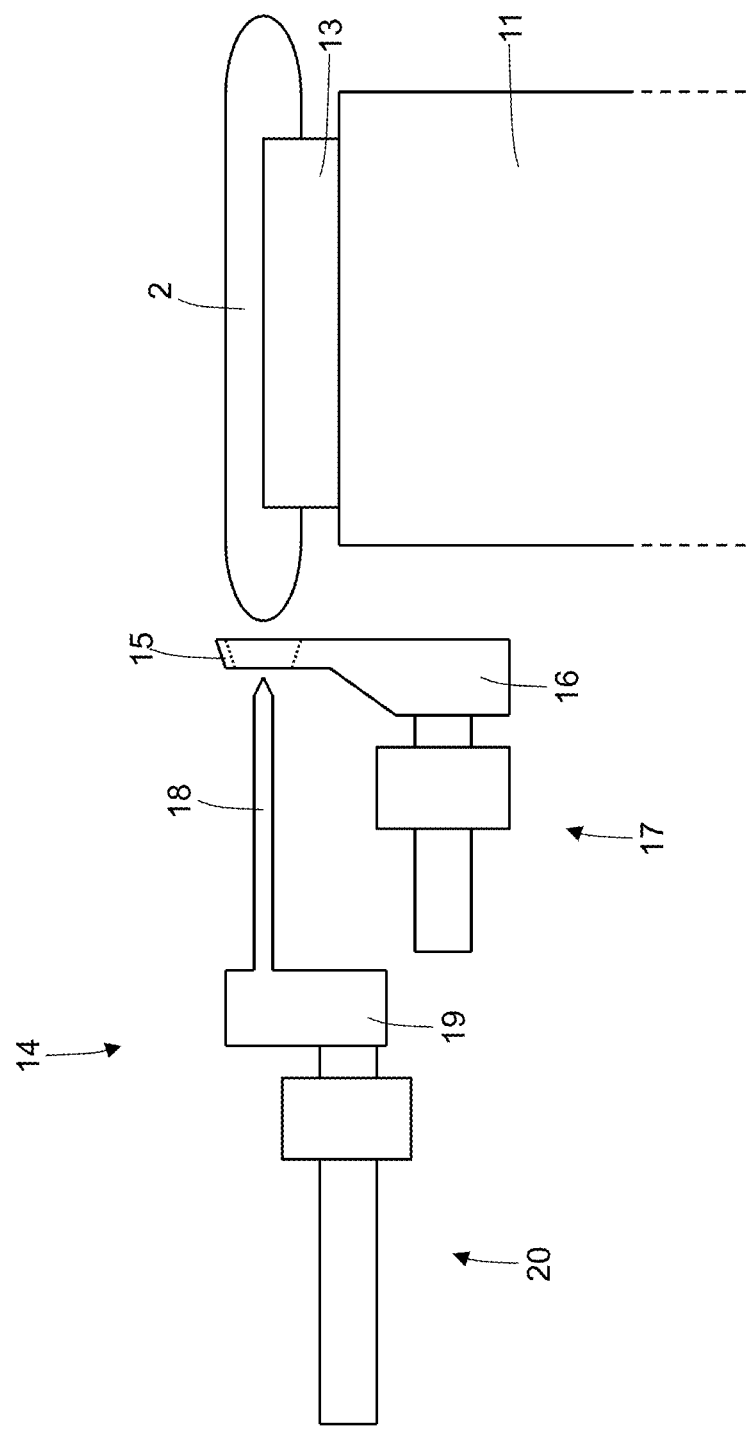
FIG. 10 is a schematic view of a processing device of the processing unit of FIG. 9.

As better illustrated in FIG. 10, each pocket 13 of the processing wheel 11 is coupled to a corresponding processing device 14 which is designed to carry out a processing procedure at one end of a cigar 2 contained in the pocket 13 itself. Each processing device 14 moves along the processing path P1 with a synchronous movement with the corresponding pocket 13 of the processing wheel 11 so as to follow the pocket 13 itself, and therefore be able to process the cigar 2 carried by the pocket 13 along the processing path P1; according to a preferred embodiment, each processing device 14 is carried by the processing wheel 11 and is directly mounted in the area of the respective pocket 13.

Each processing device 14 comprises a drawing device 15 which engages an end of a cigar 2 to mechanically and axially compress the ends so as to deform (crimp) the end itself (in this way it is easier to insert a mouthpiece 6 on the end of the cigar 2); the drawing is a forming process that induces a change in the shape of the starting cigar 2 through the plastic deformation due to the action of axial compressive forces impressed by the drawing device 15. According to a possible embodiment, the drawing device 15 is electrically heated (i.e. by means of an electrical thermal conducting heating element coupled to the drawing device 15) so as to heat the cigar 2 during the drawing procedure (in this way the deformation of the cigar imposed by the drawing device 15 is less subject to elastic return at the end of the drawing procedure). The drawing device 15 consists in a hollow body centrally having a frusto-conical cavity which subjects the end of a cigar 2 to a gradual compression; the frusto-conical cavity can be a through hole as illustrated in FIG. 10 or a blind hole according to an alternative not illustrated. The drawing device 15 is carried by a support 16 which is mounted axially movable under the control of an actuator device 17 (typically based on cams that are driven by the rotation of the processing wheel 11 around the rotation axis 12) that moves the support 16 back and forth so as to bring the drawing device 15 into contact with the end of a cigar 2 (forward stroke) and then to move away the drawing device 15 from the end of the cigar 2 (return stroke). The drawing procedure carried out by the processing device 14 it is sometimes also indicated by the term "crimping".

Each processing device 14 comprises a needle 18 which engages one end of a cigar 2 to perforate the end itself (in this way the smoke can pass through the end provided with the mouthpiece 6); according to a possible embodiment, the needle is electrically heated (i.e. by means of an electrical thermal conducting heating element coupled to the needle 18) so as to heat the cigar 2 during the perforation procedure (in this way the deformation of the cigar imposed by the needle 18 is less subject to the elastic return at the end of the perforation procedure). The needle 18 is carried by a support 19 which is mounted axially movable under the control of an actuator device 20 (typically based on cams that are driven by the rotation of the processing wheel 11 around the rotation axis 12) which moves the support 19 back and forth so as to bring the needle 18 into contact with the end of a cigar 2 (forward stroke) and then to move away the needle 18 from the end of the cigar 2 (return stroke). According to a preferred embodiment illustrated in FIG. 10, each needle 18 is designed to pass through a hole of the corresponding drawing device 15 (in particular through the frusto-conical cavity of the corresponding drawing device 15); in use, each drawing device 15 is moved forward to engage the end of a corresponding cigar 2 and while the drawing device 15 engages the end of the cigar 2 on the outside, the needle 18 is moved forward to perforate the end itself; in this way, the end of the cigar 2 is axially held by the drawing device 15 while the hole is carried out by means of the needle 18 and therefore decreasing the risk of causing undesired deformations to the end itself, due to the perforation.

Figure 3:
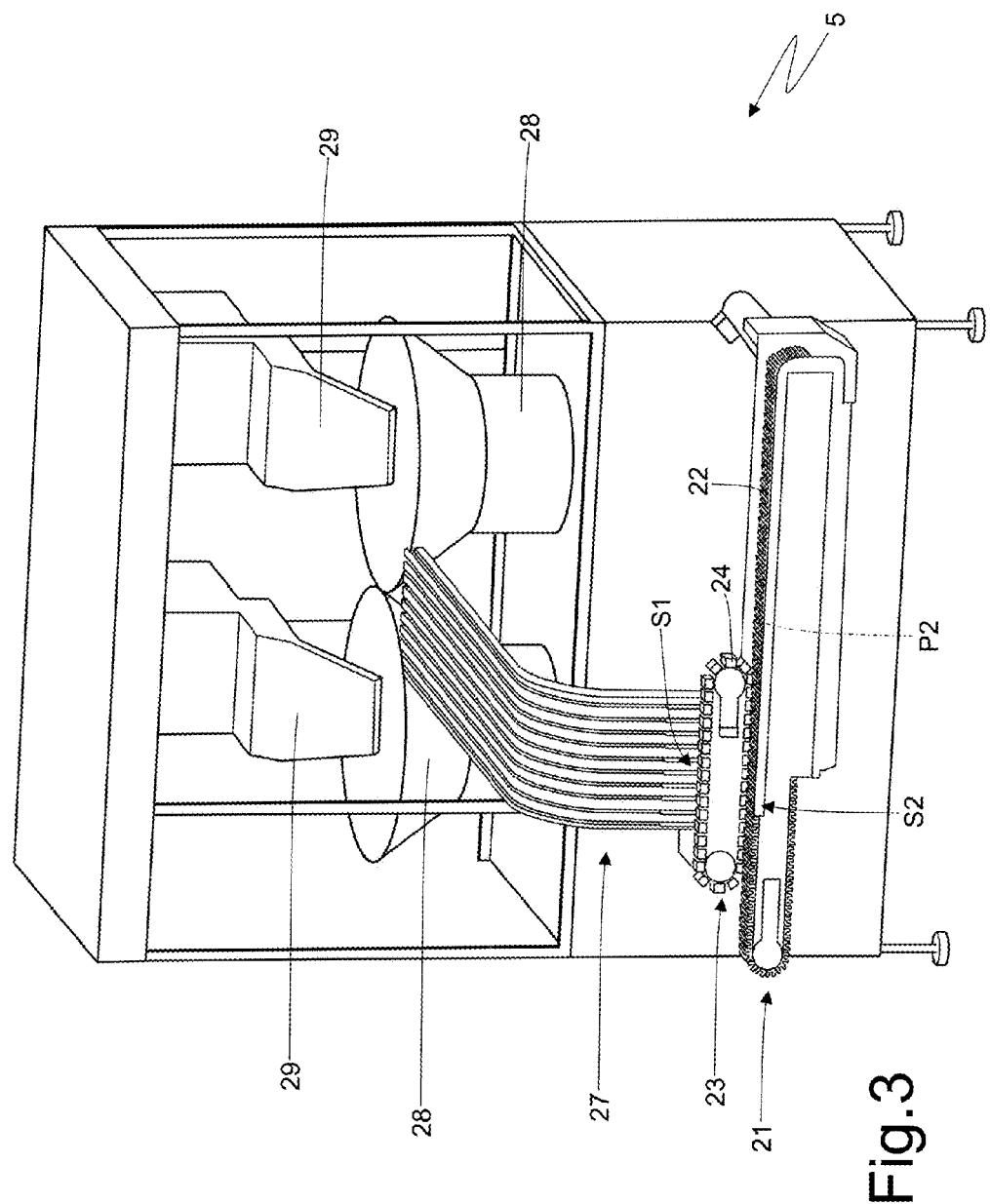
FIG. 3 is a schematic and perspective view of the unit for the attachment of mouthpieces of FIG. 1.

As illustrated in FIGS. 1, 2 and 3, the attachment unit 5 comprises a belt conveyor 21 which is horizontally arranged and is provided with pockets 22 (better illustrated in FIGS. 4 and 8) designed to contain respective cigars 2 to feed the 2 cigars themselves along a straight and horizontal attachment path P2. The belt conveyor 21 receives the cigars 2 in succession from the processing wheel 11 of processing unit 4 which operates as a link between the belt conveyor 9 of the input unit 3 and the belt conveyor 21 of the attachment unit 5. In addition, the attachment unit 5 comprises a belt conveyor 23 which is arranged horizontal and parallel and next to the belt conveyor 21 and is provided with pockets 24 (better illustrated in FIG. 4) which are designed to contain respective mouthpieces 6 so as to feed the mouthpieces 6 themselves along the attachment path P2. In particular, the pockets 24 of the belt conveyor 23 receive the mouthpieces 6 in a feeding station S1 arranged upstream of the attachment path P2 and transfer the mouthpieces 6 to corresponding cigars 2 carried by the pockets 22 of the belt conveyor 21 in an attachment station S2 arranged along the attachment path P2.

According to a preferred embodiment illustrated in the accompanying figures, the belt conveyor 9 of the input unit 3 and the belt conveyor 21 of the attachment unit 5 are vertically aligned to one another while the processing wheel of the processing unit 4 is arranged under the belt conveyors 9 and 21; this arrangement is particularly favourable because it allows to significantly reduce the transverse dimensions of the processing unit 4.

In the area of the attachment station S2 a coupling device 25 is provided (illustrated schematically in FIGS. 5-8) which is provided with a plurality (ten in the attached figures) of the pushing members 26, each of which is arranged along the attachment path P2 in the area of attachment station S2 and is movable along an attachment direction D1 (illustrated in FIGS. 7 and 8) perpendicular to the attachment path P2 so as to push a mouthpiece 6 carried by a pocket 24 of the belt conveyor 23 towards a corresponding cigar 2 carried by a pocket 22 of the belt conveyor 21 and then attach the mouthpiece 6 to the cigar 2 (in particular to one end of the cigar 2). The coupling device 25 comprises a plurality of pushing members 26, which are arranged parallel and next to one another and operate together so as to push each mouthpiece 6 carried by a pocket 24 of the belt conveyor 23 towards a corresponding cigar 2 carried by a pocket 22 of the belt conveyor 21.

As illustrated in FIGS. 1, 2 and 3, in the area of the feeding station S1 a feeding device 27 is arranged, which feeds the mouthpieces 6 towards the pockets 24 of the belt conveyor 23; in particular, the feeding device 27 comprises a plurality of channels (ten in the accompanying figures) which are "L"-shaped (as illustrated in FIG. 3) and end with vertical segments in the area of the feeding station S1 so as to feed by gravity the mouthpieces towards the pockets 24 of the belt conveyor 23. The channels of the feeding device 27 receive the mouthpieces 6 from two vibrating containers 28 (of known type), each of which receives from the top a disordered mass of mouthpieces 6 from a loader 29, and provides the feeding of the mouthpieces 2, one after the other and according to a predetermined orientation (that is, all oriented and arranged in the same direction) towards the inlets of the corresponding channels of the feeding device 27. Obviously, the vibrating containers 28 can be replaced by any other ordering device such as, for example, centrifugal force devices or fixed rail rotating devices, of a substantially known type.

As better illustrated in FIGS. 5 and 6, the belt conveyor 21 moves forward with a continuous motion and with a feeding speed V1, and is provided with a moving member 30 (illustrated in FIGS. 7 and 8) which cyclically moves back and forth the pushing members 26 along a chasing direction D2 which is parallel to the attachment path P2 (i.e. perpendicular to the attachment direction D1), thus carrying out an operating stroke that is synchronous with the movement of the belt conveyor 21 and a return stroke in the opposite direction. In other words, during the operating stroke the moving member 30 moves the pushing members 26 parallel to the attachment path P2, with the feeding speed V1 and in a synchronous manner with the pockets 22 of the belt conveyor 21; therefore, during the operating stroke the moving member 30 always keeps each pushing member 26 aligned with a corresponding pocket 22 of the belt conveyor 21 so as to allow the pushing member 26 to push a mouthpiece 6 from a pocket 24 of the belt conveyor 23 towards a cigar 2 carried by a pocket 22 of the belt conveyor 21.

In the embodiment illustrated in the accompanying figures, the belt conveyor 23 moves forward with a continuous motion and with a feeding speed V2 equal to half the feeding speed V1; furthermore, a moving member 31 is provided, which cyclically moves back and forth along the belt conveyor 23 in the chasing direction D2 parallel to the attachment path P2, thus carrying out an operating stroke in the same feeding direction of the belt conveyor 21 and with a feeding speed V3 equal to the feeding speed V2 (i.e. equal to half the feeding speed V1) and a return stroke in the opposite direction. Obviously, in the attachment station S2 the pockets 24 of the belt conveyor 23 are synchronous with the corresponding pockets 22 of the belt conveyor 21 only during the operating stroke of the moving member 31, and therefore the pushing members 26 push the mouthpieces 6 carried by the pockets 24 towards the corresponding 2 cigars carried by the pockets 22 during the operating stroke of moving member 31.

During the operating stroke of moving member 31, the belt conveyor 23 moves forward with a continuous motion and with a feeding speed V2 equal to half the feeding speed V1 and, at the same time, the entire belt conveyor 23 moves with a feeding speed V3 equal to half the feeding speed V2 (i.e. equal to half the feeding speed V1); consequently the lower branch of the belt conveyor 23 (in the area of the attachment station S2) moves in a synchronous manner with the belt conveyor 21 as by summing the feeding speed V2 of the belt conveyor 23 with the feeding speed V3 imparted to the entire belt conveyor 23 by the moving member 31 the feeding speed V1 of the belt conveyor 21 is exactly obtained. During the operating stroke of the moving member 31, the belt conveyor 23 moves forward with a continuous motion and with a feeding speed V2 equal to half the feeding speed V1 and, at the same time, the entire belt conveyor 23 moves with the feeding speed V3 that is equal to the feeding speed V2 (i.e. equal to half the feeding speed V1); consequently the upper branch (opposite to the lower branch) of the belt conveyor 23 (in the area of the feeding station S1) remains stationary with respect to the feeding device 27 as by summing the feeding speed V2 of the belt conveyor 23 with the feeding speed V3 imparted to the entire belt conveyor 23 by the moving member 31 a feeding speed equal to zero is obtained. It is important to note that, during the operating stroke of the moving member 31, the feeding speed V3 imparted to the entire belt conveyor 23 by the moving member 31 is synchronised with the feeding speed V2 of the belt conveyor 23 in the lower branch of the belt conveyor 23 (in the area of the attachment station S2) while the feeding speed V3 imparted to the entire belt conveyor 23 by the moving member 31 is opposite to the feeding speed V2 of the belt conveyor 23 in the upper branch of the belt conveyor 23 (in the area of the feeding station S1).

To better visualize what is described above, in FIGS. 5 and 6 an assembly A of pockets 24 of the belt conveyor 23 that are arranged in the feeding station S1, an assembly B of pockets 24 of the belt conveyor 23 that are arranged in the attachment station S2, and an assembly C of pockets 22 of the belt conveyor 21 that are arranged in the attachment station S2 have been put in evidence. During the operating stroke of the moving member 31, the assembly A of pockets 24 of the belt conveyor 23 that are arranged in the feeding station S1 remains stationary in front of the feeding device 27 so as to receive corresponding mouthpieces 6. Whereas, during the operating stroke of the moving member 31, the assembly B of pockets 24 of the belt conveyor 23 that are arranged in the attachment station S2 is moved along the attachment path P2 in a synchronized manner with the assembly C of pockets 22 of the belt conveyor 21 that are arranged in the attachment station S2 so as to allow the transfer of mouthpieces 6 from the pockets 24 to the pockets 22 by way of the action of the pushing members 26 (which also advance along the attachment path P2 in a synchronized manner with the assembly C of pockets 22 of the belt conveyor 21 due to the action of the moving member 30).

According to a different embodiment not illustrated, the belt conveyor 23 moves forward with a continuous motion and with the same feeding speed V1 of the belt conveyor 21; in this embodiment, the moving member 31 is not provided but it is necessary to provide an inserting member that is able to chase the pockets 24 of the belt conveyor 23 in the area of the feeding station S1 so as to insert the mouthpieces 6 in the pockets 24 themselves.

According to a possible embodiment, within each mouthpiece 6 a corresponding filter plug is inserted before attaching the mouthpiece 6 itself to an end of a cigar 2. For example, the filter plugs may be inserted into the mouthpieces 6 upstream of the coupling device 27, or in the area of the coupling device 27.

According to a possible embodiment, on each end of the cigar 2 an adhesive substance that causes a gluing of the mouthpiece 6 to the cigar 2 may be applied; for example, the adhesive substance may be attached by means of a gumming device arranged along the attachment path P2 (obviously upstream of the attachment station S2) arranged along the processing path Pl. Alternatively, the adhesive substance may be applied to the mouthpieces 6 by means of a gumming device arranged in the area of the coupling device 27 or in the area of the belt conveyor 23.

In the preferred embodiment illustrated in the attached figures, the coupling device 25 comprises a plurality of pushing members 26 arranged side by side that operate in parallel; according to a different embodiment not illustrated, the coupling device 25 comprises a single pushing member 26.

The attachment unit 5 described above has numerous advantages.

In the first place, the attachment unit 5 described above is capable of achieving particularly high operating speeds; this result is achieved both thanks to the fact that the pockets 24 of the belt conveyor 23 remain facing the corresponding pockets 22 of the belt conveyor 21 for a very long stretch of the attachment path P2, and thanks to the fact that the attachment unit 5 described above operates in parallel, i.e. attaches, at each operating cycle, a plurality of mouthpieces (ten, in the embodiment illustrated in the accompanying figures) an equal amount of cigars 2 while the pockets 24 of the belt conveyor 23 remain facing the corresponding pockets 22 of the belt conveyor 21.

In addition, the attachment unit 5 described above is particularly simple and inexpensive to produce in that it provides the use of simple belt conveyors without excessive overall movement within the same.

Finally, the attachment unit 5 described above is relatively compact and can be inserted, when needed, in an existing packaging machine in a relatively simple manner.

The invention claimed is:

1. A unit (5) for the attachment of mouthpieces (6) to cigars (2); the attachment unit (5) comprises:
   a first belt conveyor (21) fed with a continuous motion and with a first feeding speed (VI) and provided with first pockets (22), which are designed to contain respective cigars (2), so as to feed said cigars (2) along a straight attachment path (P2);
   a second belt conveyor (23), which is arranged parallel and next to the first belt conveyor (21) and is provided with second pockets (24), which are designed to contain respective mouthpieces (6), so as to feed said mouthpieces (6) along the attachment path (P2);
   a coupling device (25), which is provided with at least one pushing member (26), which is arranged along the attachment path (P2) in the area of an attachment station (S2) and is movable along an attachment direction (D1) that is perpendicular to the attachment path (P2), so as to push a mouthpiece (6) carried by a second pocket (24) towards a corresponding cigar (2) carried by a first pocket (22) and then attach the mouthpiece (6) to the cigar; and
   a first moving member (30), which cyclically moves the pushing member (26) back and forth along a chasing direction (D2) that is parallel to the attachment path (P2), thus carrying out an operating stroke that is synchronous with the movement of the first belt conveyor (21) and a return stroke in an opposite way.

2. An attachment unit (5) according to claim 1, wherein the coupling device (25) comprises a plurality of pushing members (26), which are arranged parallel and next to one another and operate together, so as to push each mouthpiece (6) carried by a second pocket (24) towards a corresponding cigar (2) carried by a first pocket (22).

3. An attachment unit (5) according to claim 1, wherein:
   the second belt conveyor (23) is fed with a continuous motion and with a second feeding speed (V2), which is equal to half the first feeding speed (V1);
   there is provided a second moving member (31), which cyclically moves the second belt conveyor (23) back and forth along a chasing direction (D2) that is parallel to the attachment path (P2), thus carrying out an operating stroke in the same feeding direction of the first belt conveyor (21) and with a third feeding speed (V3) that is equal to the second feeding speed (V2) and a return stroke in an opposite way; and
   the pushing member (26) pushes a mouthpiece (6) carried by a second pocket (24) towards a corresponding cigar (2) carried by a first pocket (22) during the operating stroke of the second moving member (31).

4. An attachment unit (5) according to claim 3, wherein:
   there is provided a feeding device (27), which inserts at least one mouthpiece (6) into a second pocket (24) of the second belt conveyor (23) in a feeding station (S1), which is arranged along a straight segment of the second belt conveyor (23), which is opposite a straight segment where the attachment station (S2) is arranged; and
   the feeding device (27) is arranged in a fixed position in the feeding station (S1) and inserts a mouthpiece (6) into a second pocket (24) of the second belt conveyor (23) during the operating stroke of the second moving member (31).

5. An attachment unit (5) according to claim 1, wherein the second belt conveyor (23) is fed with a continuous motion and with the same feeding speed (V1) of the first belt conveyor (21).

6. An attachment unit (5) according to claim 1 and comprising:
   a processing wheel (11), which is arranged upstream of the first belt conveyor (21) and is provided with third pockets (13), which are designed to contain respective cigars (2), so as to feed said cigars (2) along a circular processing path; and
   at least one processing device (14), which is designed to carry out a processing procedure at an end of a cigar (2) contained in a third pocket (13) of the processing wheel (11).

7. An attachment unit (5) according to claim 6, wherein the processing device (14) comprises a drawing device (15), which engages an end of a cigar (2) so as to axially compress said end.

8. An attachment unit (5) according to claim 6, wherein the processing device (14) comprises a needle (18), which engages an end of a cigar (2) so as to centrally perforate said end.

9. An attachment unit (5) according to claim 6, wherein the processing device (14) comprises:
   a drawing device (15), which engages an end of a cigar (2) so as to axially compress said end; and
   a needle (18), which engages an end of a cigar (2) so as to centrally perforate said end and is designed to pass through a central hole of the drawing device (15).

10. An attachment unit (5) according to claim 9, wherein the needle (18) perforates the end of the cigar (2) while the drawing device (15) engages said end on the outside.

* * * * *